United States Patent [19]
Glanville et al.

[11] 3,819,552
[45] June 25, 1974

[54] ADHESIVE COMPOSITION

[75] Inventors: Lewis Malcolm Glanville, Southampton; Anthony F. M. Dunkley, Winchester, both of England

[73] Assignee: The International Synthetic Rubber Company Limited, Southampton, England

[22] Filed: Oct. 20, 1972

[21] Appl. No.: 299,233

[30] Foreign Application Priority Data
Oct. 22, 1971 Great Britain .................. 49290/71

[52] U.S. Cl. ........ 260/27 BB, 260/23.7 H, 260/829, 260/41.5 R, 260/888, 260/889
[51] Int. Cl. ............................................. C08f 29/10
[58] Field of Search ............. 260/23.7 H, 829, 41.5, 260/33.6, 27 BB, 41.5 R, 888, 889

[56] References Cited
UNITED STATES PATENTS

| | | | |
|---|---|---|---|
| 3,090,768 | 5/1963 | Ray et al. | 260/23.7 H |
| 3,169,566 | 2/1965 | Ziarnik | 260/23.7 H |
| 3,230,189 | 1/1966 | Johnson | 260/23.7 H |
| 3,400,090 | 9/1968 | Maslow | 260/23.7 H |
| 3,408,253 | 10/1968 | Eckert | 161/253 |

OTHER PUBLICATIONS
"Rubber Handbook," 1958, page 95, 94, & 93.

*Primary Examiner*—M. J. Welsh
*Attorney, Agent, or Firm*—Cushman Darby & Cushman

[57] ABSTRACT

An adhesive composition comprises chlorobutyl rubber, an unsaturated ethylene-alpha olefin polymer of high molecular weight (as defined), carbon black, a liquid isobutene polymer, an ethylene alpha-olefin copolymer of low molecular weight (as defined), a tackifying resin and a sulphur vulcanisation system, each component being present in specified proportions. The adhesive composition is particularly useful in the preparation of an article of manufacture comprising at least two sheets of vulcanised EPDM rubber compositions, the edge portion of the sheets being adhered together at the interface by means of the adhesive composition which has been vulcanised after bringing said edges together.

6 Claims, No Drawings

ADHESIVE COMPOSITION

This invention relates to an adhesive composition.

Copolymers of ethylene with lower α-olefins, such as propylene and butene-1, suffer from the disadvantage that in the unvulcanised state they exhibit little self-adhesion or "tack." This disadvantage leads to difficulties in forming composite articles from compositions comprising such copolymers. We have now devised an adhesive composition which is particularly effective in adhering together materials, particularly elastomeric compositions, e.g. compositions comprising the aforementioned copolymers.

According to the present invention an adhesive composition comprises (A) one hundred parts by weight of an elastomeric component comprising 30 to 90 parts of chlorobutyl rubber and 70 to 10 of an unsaturated ethylene/α-olefin polymer having an intrinsic viscosity (I.V.) measured as a 0.1 percent by weight solution in toluene at 20°C of more than 1.4, one hundred parts of the elastomeric component (A) being compounded with 50 to 200 parts of (B) reinforcing carbon black; (C) 5 to 50 parts of a liquid isobutene polymer; (D) 10 to 100 parts of ethylene/α-olefin copolymer having an I.V. (measured as above) of 0.05 to 1.4; (E) 5 to 50 parts of a tackifying resin, and (F) a sulphur vulcanisation system.

Also according to the invention a process for adhering one material to another comprises interposing an adhesive composition as just defined, preferably in strip form, between the materials to be adhered together and subjecting the composition to pressure to maintain the materials and the composition in substantial contact under vulcanising conditions until the adhesive composition has been vulcanised.

The unsaturated ethylene/α-olefin polymer having an I.V. of at least 1.4 is preferably an ethylene-propylene terpolymer (EPT or EPDM) for example one wherein the termonomer is dicyclopentadiene, 1,4-hexadiene, methylene norbornene, or ethylidene norbornene. Generally the I.V. does not exceed 2.5. Such polymers are of high molecular weight ($M_n$ = 50,000 or more). The molar ratio of ethylene to propylene in the EPT may be for example 40:60 to 85:15, and generally is in the range 60:40 to 80:20 giving a rubbery product. The proportion of termonomer is generally such as to give the terpolymer an iodine number of at most 50, generally 5 to 30, typically 10 to 20.

Examples of suitable reinforcing carbon blacks are high abrasion furnace blacks e.g. HAF grades N330, 339 and 347; fast extruding furnace blacks e.g. FEF grade N440; intermediate super abrasion furnace blacks, and mixtures of such blacks, e.g. HAF/ISAF grade 285. High structure blacks are preferred and preferably the carbon black content in the composition is at least 100 parts (phr).

The liquid isobutene polymer may have a viscosity (centistokes at 210°F) of up to e.g. 5,000, polymers having viscosities in the range 200 to 5000 centistokes being very suitable.

The ethylene/α-olefin copolymer having an I.V. of 0.05 to 1.4 is generally saturated and is preferably a liquid or semisolid copolymer of ethylene and propylene. An EPT having an I.V. in the above range may also be used. The I.V. is preferably in the range 0.1 to 1.0. The number average molecular weight of the copolymer is preferably 500 to 50,000 i.e. low molecular weight.

This is preferably prepared by the process described in our U.K. Patent application No. 3057/72. In this process a hydrocarbon solution of a normally solid alpha olefin polymer containing tertiary carbon atoms is intimately mixed with aluminium tribromide or ball-milled aluminium trichloride and preferably a cocatalyst therefor or substance capable of forming a cocatalyst and, after reaction, an alpha olefin of lower molecular weight than the starting polymer is recovered. Reaction takes place under mild conditions of temperature and pressure, e.g. at temperatures below 100°C and 0 to 5 atmospheres absolute.

The tackifying resin may be, for example, an alkyl phenol-formaldehyde resin, a hydrogenated wood rosin, or a derivative thereof, a coumarone indene resin, a pentaerythritol resin derivative a polyterpene resin or a terpene-phenolic resin. The resin and isobutylene polymer used are both compatible with the elastomeric component of the adhesive composition and are preferably non-volatile and non-migratory.

The sulphur vulcanising system which is used is preferably one which can vulcanise (cure) very quickly, e.g. in a minute or less, at elevated temperature (100°C or more). One based on a dibenzthiazyl disulphide-cyclohexyl benzthiazyl sulphenamide mixed accelerator system is very effective.

An adhesive composition according to the present invention is particularly suitable for adhering together materials, particularly materials comprising unvulcanised or vulcanised elastomeric compositions, especially when one or both materials is a vulcanised ethylene-propylene terpolymer composition. The adhesive composition according to the present invention has good ozone resistance and it retains its tackiness for a considerable period of time (e.g. several days). Sheets of EPDM adhered together along overlapped edge portions by an adhesive composition of the present invention are particularly useful as reservoir sheeting, tank linings and roofing strips.

The present invention is illustrated by the following Example, which is not to be considered as limiting the scope of the invention. Intrinsic viscosities were measured as 0.1 percent by weight solutions in toluene at 20°C.

EXAMPLE

An adhesive composition was prepared according to the following composition:

| | Parts by weight |
|---|---|
| Chlorobutyl Rubber (Enjay[1] HT 1066) | 60 |
| Intolan[2] 340.A EPDM | 40 |
| F.E.F. carbon black (N440) | 140 |
| Isobutene polymer (Hyvis[3] 200) | 15 |
| EP[5] (60:40 ratio) of I.V. 0.26 | 60 |
| Alkyl phenol-formaldehyde resin-Rousselot[4] 75-10 | 10 |
| Dibenzthiazyl disulphide | 2 |
| Cyclohexyl benzthiazyl sulphenamide (CBS) | 0.8 |
| Sulphur | 1.5 |
| An activator of zinc oxide (5 parts) and stearic acid (1 part) was included as is conventional practice. | |

Notes.
1. Enjay is a Trade Mark of Esso Chemical Limited.
2. Intolan is a Registered Trade Mark of International Synthetic Rubber Company Limited. (The Intrinsic Viscosity of Intolan 340 A at 20°C in toluene is 1.5 (equivalent to an I.V. of approximately 2.1 at 30°C in cyclohexane) ). Intolan 340 A is an EP terpolymer 60:40 E:P, iodine no. = 12.
3. Hyvis is a Trade Mark of the British Petroleum Company Limited.
4. Rousselot is a Trade Mark of Rousselot Chemicals Limited.
5. The EP was prepared by the process of U.K. Patent Application No. 3057/72.

The above components were mixed in a Banbury (Trade Mark) internal mixer at 80°C with the exception of the last three mentioned, and the activator, comprising the vulcanisation system, which were mixed in to the composition on a mill. The composition was calendered into strips. A strip was taken and placed between two strips of vulcanised EPDM rubber sheeting under a pressure of 1 lb per sq. inch and cured for 1 minute at 200°C. It was found that the strips of EPDM sheeting were adhered strongly together and had a bond tearstrength of 18 lbs per inch.

The example was repeated using an EP of I.V. (measured under the same conditions) of 0.15 in place of that of I.V. 0.26. Essentially similar results were obtained.

The example was repeated using a terpene phenolic resin in place of the alkyl phenol formaldehyde resin. The resin used was (a) Rousselot 70-10 or (b) Hoechst PT214. Essentially similar results were obtained in each case.

What we claim is:

1. An adhesive composition in strip form comprising (A) one hundred parts by weight of an elastomeric component comprising 30 to 90 parts of chlorobutyl rubber and 70 to 10 parts of an unsaturated ethylene-propylene polymer having an intrinsic viscosity measured as a 0.1 percent by weight solution in toluene at 20°C of more than 1.4, one hundred parts of the elastomeric component (A) being compounded with (B) 50 to 200 parts of a reinforcing carbon black; (C) 5 to 50 parts of a liquid isobutene polymer; (D) 10 to 100 parts of an ethylene-propylene copolymer having an intrinsic viscosity measured as a 0.1 percent by weight solution in toluene at 20° of 0.05 to 1.0; (E) 5 to 50 parts of a tackifying resin and (F) sulphur vulcanisation ingredients all parts being parts by weight.

2. An adhesive composition according to claim 1 wherein the unsaturated ethylene-propylene polymer is an ethylene-propylene terpolymer and component (D) is a saturated ethylene-propylene copolymer.

3. An adhesive composition according to claim 1 wherein the tackifying resin is selected from an alkyl phenol-formaldehyde resin, a hydrogenated wood rosin, a derivative of a hydrogenated wood rosin, a coumarone indene resin, a pentaerythritol resin derivative, a polyterpene resin or a terpene phenolic resin.

4. An adhesive composition according to claim 1 wherein the ethylene propylene copolymer in component A has an intrinsic viscosity measured as a 0.1 percent by weight solution in toluene at 20° of 1.4 to 2.5 and the ethylene-propylene copolymer of component D has an intrinsic viscosity measured as a 0.1 percent by weight solution in toluene at 20° of 0.1 to 1.0.

5. An adhesive composition according to claim 1 wherein component D is an ethylene-propylene copolymer prepared by intimately mixing a hydrocarbon solution of a normally solid ethylene-propylene polymer with a halide selected from the group consisting of aluminum tribromide and ball-milled aluminum trichloride and a cocatalyst for said halide and recovering the ethylene propylene polymer of lowered molecular weight.

6. An adhesive composition according to claim 1 wherein the sulphur vulcanisation ingredients employed enable the adhesive composition to be vulcanised at a temperature of at least 100°C. in a time of not over 1 minute.

* * * * *